United States Patent [19]

Madon et al.

[11] Patent Number: 5,993,645

[45] Date of Patent: Nov. 30, 1999

[54] CATALYST FOR CRACKING OIL FEEDSTOCKS CONTAMINATED WITH METAL

[75] Inventors: Rostam J. Madon, Flemington; John M. Macaoay, Linden, both of N.J.

[73] Assignee: Engelhard Corporation, Iselin, N.J.

[21] Appl. No.: 08/754,609

[22] Filed: Nov. 20, 1996

Related U.S. Application Data

[63] Continuation-in-part of application No. 08/569,810, Dec. 8, 1995, abandoned.

[51] Int. Cl.$^6$ .................................................. C10G 11/05
[52] U.S. Cl. ........................ 208/114; 208/120.01; 502/63; 502/64; 502/68; 502/72; 502/79
[58] Field of Search ............................... 502/64, 63, 68, 502/72, 79; 208/114, 120.01

[56] References Cited

U.S. PATENT DOCUMENTS

| | | | |
|---|---|---|---|
| 3,506,594 | 4/1970 | Haden, Jr. et al. | 252/455 |
| 3,663,165 | 5/1972 | Haden, Jr. et al. | 23/112 |
| 4,430,199 | 2/1984 | Durante et al. | 208/114 |
| 4,454,241 | 6/1984 | Pine et al. | 502/68 |
| 4,493,902 | 1/1985 | Brown et al. | 502/65 |
| 4,977,122 | 12/1990 | Eberly | 502/69 |
| 5,023,220 | 6/1991 | Dight et al. | 502/65 |
| 5,243,121 | 9/1993 | Madon et al. | 585/649 |
| 5,395,809 | 3/1995 | Madon et al. | 502/68 |
| 5,427,753 | 6/1995 | Miura et al. | 423/239.2 |
| 5,559,067 | 9/1996 | Lerner et al. | 502/68 |

FOREIGN PATENT DOCUMENTS 0 252 761 A2   1/1988   European Pat. Off.   ......... B01J 29/08

*Primary Examiner*—Thomas Dunn
*Attorney, Agent, or Firm*—Raymond F. Keller

[57] ABSTRACT

A calcined cracking catalyst comprising zeolite crystals in an inorganic oxide matrix and containing less than about 0.75% $Na_2O$ and, from 0.1 to 10% P expressed as $P_2O_5$, the cracking catalyst being further characterized by exhibiting a spectra with a peak at about 3735 $cm^{-1}$ when treated with pyridine and analyzed by FTIR. A process for manufacturing an FCC catalyst characterized by high tolerance to contaminated metals comprises providing fluid cracking catalyst microspheres containing zeolite Y in an inorganic oxide matrix and analyzing 20 to 60% by weight $Al_2O_3$ and analyzing less than 0.75% wt. $Na_2O$; impregnating the catalyst with a solution of a phosphate or phosphite salt in amount such the microspheres analyze 0.5 to 10% by weight $P_2O_5$ and calcining the microspheres in the absence of steam at a temperature above 1300° F. and below 1600° F. and recovering the product characterized exhibiting a spectra with a peak at about 3687 $cm^{-1}$ and the intensity ratio of the peak at 3687 $cm^{-1}$ to the peak at 3675 $cm^{-1}$ is greater than about 0.8 when treated with pyridine and analyzed by FTIR.

7 Claims, 3 Drawing Sheets

CATALYST FOR CRACKING OIL FEEDSTOCKS CONTAMINATED WITH METAL

This application is a continuation-in-part of U.S. Ser. No. 08/569,810, filed on Dec. 8, 1995, now abandoned, and entitled CATALYST FOR CRACKING OIL FEEDSTOCKS CONTAMINATED WITH METAL.

FIELD OF THE INVENTION

This invention relates to the treatment of zeolitic cracking catalysts with a phosphorus compound to improve performance when used to crack feedstock contaminated with metals.

BACKGROUND OF THE INVENTION

In recent years the oil refining industry has shifted to processing a larger quantity of resid. Since the early 1980's many refiners have been processing at least a portion of residual oil as a feedstock in their units and several now crack a full residual oil in their units. Processing resid can drastically reduce yields of valuable products when compared to cracking a light feed.

Several factors are important to resid catalyst design. It is highly favorable if the catalyst can help increase gasoline yields, upgrade bottoms, minimize coke and gas formation, maximize catalyst stability, and minimize deleterious contaminant selectivity due to metal contaminants in resid feedstocks such as nickel and vanadium. It is well known that metal contaminants in oil feedstocks significantly adversely affect the performance of zeolitic cracking catalysts to various degrees depending inter alia on the matrix (non zeolite) portion of the cracking catalyst. Various additives ranging from antimony, tin, alumina and sources of phosphorus have been added to feedstock or incorporated in the catalyst or used in solid particles co-circulated with cracking catalyst particles in the cracking cycle to ameliorate the effects of metals.

While many present day catalysts show good yields of desired products, especially gasoline, even when used with feeds severely contaminate with Ni and V, further lowering of coke and dry gas yields, and in particular hydrogen yields, would be desirable to improve the catalytic cracking process.

U.S. Pat. No. 4,430,199 commonly assigned, Brown et al, teaches addition of a phosphorus compound to a zeolitic cracking catalyst (or component of such catalyst), preferably prior to contamination, or to feedstock to reduce gas and coke make due to contamination by metals. Among the phosphorus compounds was ammonium hydrogen phosphate. In illustrative examples, the catalyst was a rare earth exchanged catalyst commercially supplied by assignee under the trademark HEZ-55. Such catalyst is prepared from precursor microspheres composed of the spinel form of calcined clay mixed with a small amount, e.g., 5% by weight or less of the mixture of microspheres, of the metakaolin form of calcined clay. The mixture is reacted with a sodium hydroxide solution resulting in the crystallization of about 20–25% zeolite Y in a spinel derived matrix. Because the finished catalyst has essentially the same size and shape as the precursor microspheres, the catalyst is referred to as an "in situ" catalyst. See, for example, U.S. Pat. No. 3,506,594, Haden et al, commonly assigned. We found that HEZ-55 catalyst does not exhibit the unique feature of catalysts within the scope of this invention.

U.S. Pat. No. 4,454,241, Pine et al, teaches treating a partially cation exchanged calcined zeolite containing clay derived catalyst preferably of the type allegedly described in U.S. Pat. No. 3,663,165, assigned to the assignee of the subject patent application, with a dihydrogen phosphate anion or a monohydrogen phosphate anion. This phosphorus treatment is applied to a partially cation exchange intermediate of a catalyst and not to fully exchanged catalyst which must subsequently be calcined. This particular phosphorus treatment is intended to increase cracking activity when operating with conventional feed and is not intended to passivate metals when cracking contaminated feed.

SUMMARY OF INVENTION

Figure 1:
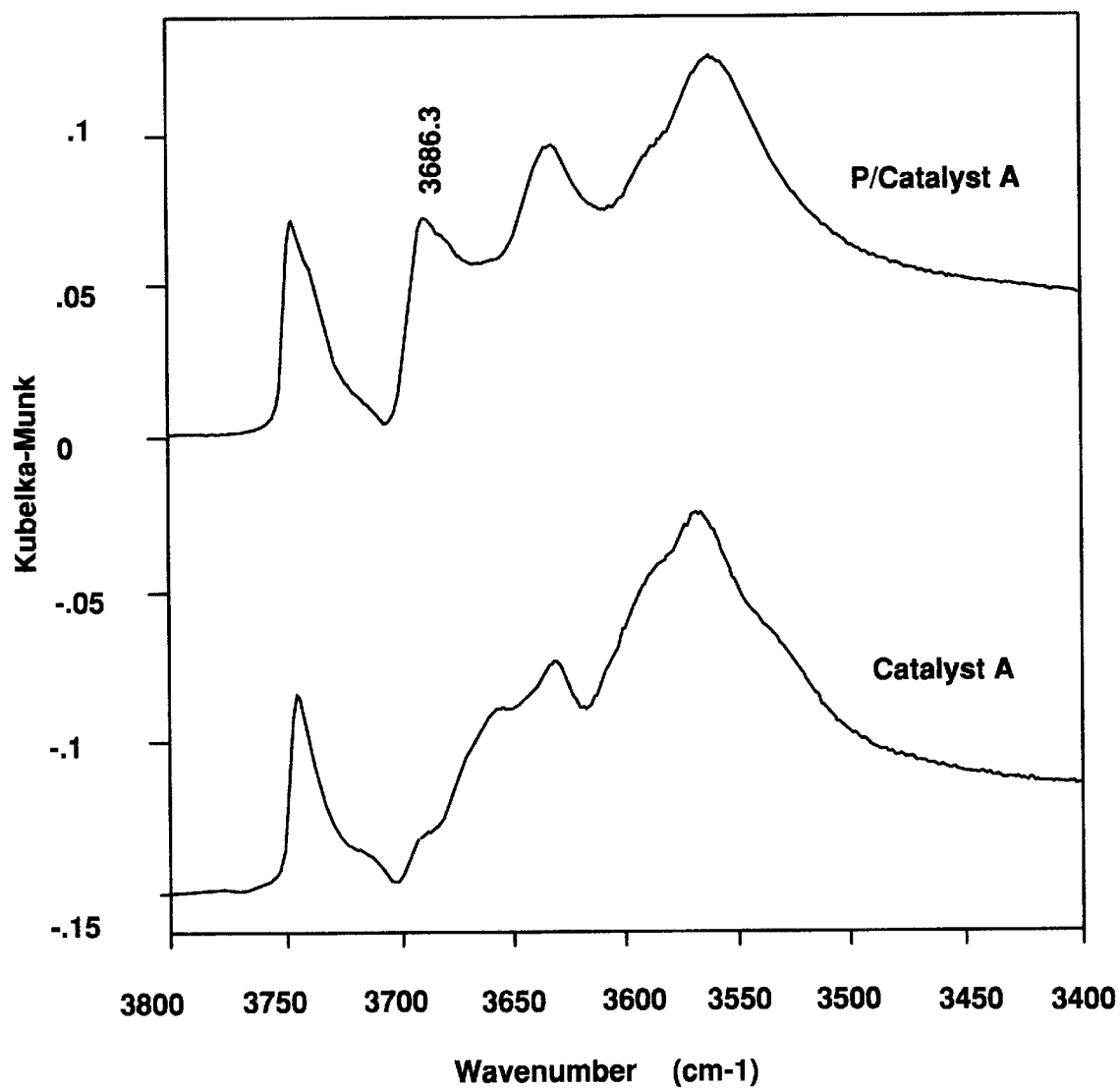
FIG. 1 represents FTIR testing of phosphorus catalyst A.

We have discovered a means for improving the performance of certain zeolitic cracking catalysts analyzing from 25 to 60% $Al_2O_3$, dry weight basis, when used to crack metals contaminated FCC feedstock by a unique post treatment with a water soluble thermally decomposable source of $P_2O_5$ followed by calcination in the absence of added steam at a temperature in the range of about 1300° F. to about 1650° F., preferably in the range of about 1400 to about 1550° F.

The process is amenable to numerous catalysts including those prepared by incorporation and in situ routes. In the case of catalysts prepared by in situ technology from calcined clay, the spray dried calcined microspheres, prior to crystallization, should contain less than 90% by weight spinel, preferably less than 75% by weight spinel.

Those catalysts that do respond to the treatment with the source of $P_2O_5$ are fully exchanged and contain less than 0.75% $Na_2O$ (weight), 25 to 50% $Al_2O_3$ and 0.1% to 10% P expressed as $P_2O_5$, preferably in the range of 0.5 to 6% by weight, after treatment with the source of phosphorous and calcination. The resulting treated (and thus dry calcined catalysts) are characterized by a unique spectra when treated with pyridine and analyzed by conventional FTIR (Fourier Infra Red Spectroscopy), using a modification of the procedure described in U.S. Pat. No. 5,243,121. Specifically, the spectra show a feature at a wavenumber of about 3687 $cm^{-1}$, as shown in the accompanying figures.

Details of preferred embodiments of the invention including illustrative examples will follow, separately for in situ and incorporated catalysts.

In Situ Catalysts

For many years a significant proportion of commercial FCC catalysts used throughout the world have been made by in situ synthesis from precursor microspheres containing kaolin that had been calcined at different severities prior to formation into microspheres by spray drying, followed by reaction in a seeded sodium silicate solution. More zeolite is crystallized than was the case of older in situ catalysts, such as HEZ-55, wherein reaction was with sodium hydroxide solution and spinel rich precursor microspheres were used. One form of the calcined kaolin clay used in such in situ processing is referred to as metakaolin. The other form, obtained by calcination at a higher temperature, is referred to in the patent literature as spinel (or, alternatively, as kaolin calcined through the characteristic kaolin exotherm or fully calcined kaolin). Generally, these in situ fluid cracking catalysts are microspheres composed of zeolite Y and an alumina rich silica-alumina matrix derived from calcined clay. It is well known that properties of the matrix can have a profound impact on the properties and performance of a zeolitic cracking catalyst. This is particularly true for in situ cracking catalysts where the zeolite Y is grown directly on/in the microsphere and is intimately associated with the matrix material. Thus, variations in the spinel content of the precursor microsphere can have a significant effect on the performance of the catalyst.

Certain catalysts are made by the in situ route with microspheres which initially (before calcination and crystallization) contain a hydrous kaolin clay to spinel weight ratio between about 70:30 to 60:40; the microspheres are then calcined at a temperature below the exotherm to convert the hydrous clay component to metakaolin. These catalysts will be referred to herein as type A catalysts. Another type of catalyst is made using microspheres which initially contain a hydrous clay to spinel weight ratio between about 40:60 to 50:50. These catalysts will be referred to herein as type B catalysts. Another type of catalyst is made by using a microsphere which predominantly, >90 wt %, contains spinel. These catalysts will be referred to herein as type C catalysts and are exemplified by HEZ-55.

FCC catalysts made by the in situ route are typically made from kaolin microspheres bound with sodium silicate or silica sol, added prior to microsphere formation. The amount of binder varies from about 5 to 25 wt % as $SiO_2$.

Catalysts we have employed from in the practice of our invention have been crystallized via previously known in-situ Y crystallization procedures, then exchanged with an ammonium compound to reduce Na ions, calcined, then exchanged again to further reduce the sodium content. To this material which has gone through what is referred to hereinafter as "2×1 processing", phosphorus is added via a suitable phosphorus compound such as mono, di or tri ammonium phosphate or phosphite at a pH between about 2.5 to 10. The material is thoroughly dried, then subjected to a high temperature calcination. The calcination is a key requirement for this invention. Calcination temperatures should be greater than about 1300° F. and about below 1650° F. The amount of P as $P_2O_5$ may vary between 0.1 and about 10% by weight. Such catalysts that contain P show lower coke and hydrogen yields and consequently higher gasoline yields during catalytic cracking in the presence of contaminant Ni and V than their counterparts that do not contain phosphorus.

See U.S. Pat. No. 4,493,902 for typical procedures used to make catalysts such as Type B catalysts using raw uncalcined (i.e., hydrated) kaolin and spinel as spray dryer feed, followed by calcination of the spray dried microspheres to convert the raw kaolin component to metakaolin and subsequent crystallization by reacting the microspheres in a seeded sodium silicate solution. The typical procedure used to make Type A catalysts is given in U.S. Pat. No. 5,395,809 which describes improved catalysts that have bottoms upgrading capability similar to Type B catalyst but with lower coke and dry gas selectivities. Applicants of said patentees found that the proportions of hydrous clay and fully calcined clay contained in the microsphere prior to in situ zeolite growth will significantly affect the properties and performance of the resulting catalyst. Furthermore, they found that the resulting properties and performance attributes such as coke yield, bottoms upgrading, metals resistance, zeolite stability, activity and ease of sodium removal did not vary linearly with the proportions of hydrous clay and fully calcined clay. As a result there was a certain range or window where all or most of the desirable properties and performance attributes were at or near optimal. Patentees found that the boundaries of this window were defined by the weight ratio of hydrous kaolin to spinel and were approximately 90:10 to 60:40.

The preferred method for making type A catalysts involved initially preparing microspheres composed of combinations of hydrous clay and spinel such that the initial hydrous clay content, expressed as weight percent, was greater than the spinel content and the microspheres, at this point of the process, were essentially free from metakaolin. The microspheres also contained a silica binder, usually greater than 5 wt % of the spray dried particles. The silica binder was provided by the addition of an alkaline sodium silicate solution. The microspheres were calcined at a predetermined temperature to convert the hydrous clay to metakaolin without significantly altering the spinel level. In situ Y zeolite FCC catalysts were then made from these microspheres by subsequent crystallization in a seeded sodium silicate solution and ion exchanged to reduce sodium level. These catalysts were just as stable and as active as Type B catalyst. Also, type A catalyst had lower coke and dry gas selectivities compared to those of Type B catalysts. The ease of sodium removal and high activity with concurrent low dry gas and coke yields made these modified microsphere catalysts excellent candidates for high octane catalysts, high isobutylene catalysts and improved bottoms upgrading catalysts.

Type D catalyst was prepared by spray drying a mixture of hydrous kaolin, gibbsite and spinel, substantially free from metakaolin, using a silica sol binder. The resulting microspheres were calcined to convert the hydrous kaolin to metakaolin, whereby the gibbsite was hydrothermally converted to a transitional alumina. The calcined microspheres composed of a mixture of spinel, transitional alumina and metakaolin were reacted with a seeded alkaline sodium silicate solution and ion-exchanged, to reduce sodium as described above. The teachings of U.S. Ser. No. 08/414,071, filed Mar. 31, 1995, now U.S. Pat. No. 5,559,067 are incorporated herein by cross-reference. The resulting 2×1 catalyst was treated with a solution of phosphorus compound dried and calcined as described above.

FCC catalysts prepared by the in situ route to which phosphorus is added via a phosphorus compound and which have undergone high temperature calcination show superior cracking behavior in the presence of contaminant Ni and V. They give substantially lower coke and hydrogen yields than catalysts not containing added phosphorus. The in situ catalysts to which phosphorus is added may be made from microspheres containing clay types in different ratios; they may be made up of all metakaolin or they may have different ratios of metakaolin and spinel. Initial microspheres before calcination may contain a mix of hydrous clay and calcined clay, such as spinel and/or metakaolin, which then are calcined to convert hydrous clay to metakaolin. In addition to clay in the microsphere, the starting microsphere may also contain other inorganic oxides or hydroxides, such as forms of alumina, at about 2 wt % to 60 wt % level. Such oxides or hydroxides of aluminum, may be gibbsite, bayerite, boehmite, gamma —$Al_2O_3$, eta —$Al_2O_3$, or other transitional alumina; oxides may also include but not be restricted to titania, zirconia, silica, and oxides of the 2A elements of the Periodic Table. The microspheres may be bound by a silica-containing binder such as, but not restricted to, sodium silicate or silica sol; or the binder may be an alumina-based binder such as sodium aluminate or alumina sol.

In situ FCC catalysts to which phosphorus has been added and then the composite calcined at a high temperature in a relatively dry condition and environment have advantages for catalytic cracking in the presence of Ni and V contaminants. In the presence of Ni and V, such P-containing catalysts show a boost in activity, lower the coke, hydrogen, and total dry gas yields, and increase the yield of gasoline and LPG. These catalysts would be particularly useful in the catalytic cracking of heavy resid feeds and heavy gas oil feeds that contain Ni and V contaminants.

Incorporation Catalysts

FCC catalysts made from finely divided, previously crystallized Y zeolite, flash calcined kaolin, other kaolin-based clays or alumina and silica binder are also used in FCC units to crack gas oil and resid type feeds. The catalyst may contain phosphate that is a result of a magnesium phosphate precursor used in the preparation of the catalyst. Though these catalysts show good yields under severe Ni and V contaminant, desirable further lowering of coke and dry gas yields is to improve the catalytic cracking process.

A material we used in practicing "incorporation" technology to carry out our invention is a catalyst prepared (in accordance with U.S. Pat. No. 492,177) by spray drying Y zeolite, flash calcined kaolin, hydrous clay, magnesium phosphate, and silica sol binder. After the standard base exchanges, described hereinabove, to reduce Na content, the catalyst was dried, and mildly calcined at about 800° F. Reference is made to U.S. Ser. No. 08/427,769 filed Apr. 25, 1995, the teachings of which are incorporated here by cross reference. These catalysts can also be prepared by mixing zeolite Y, pseudoboehmite, kaolin and a silica sol binder. Reference is made to U.S. Ser. No. 08/427,769 filed Apr. 25, 1995, the teachings of which are incorporated here by cross reference. To this finished catalyst, phosphorus was added via a suitable phosphorus compound such as di or mono ammonium phosphate or phosphite at a pH between about 2.5 to 10. The material was thoroughly dried, then subjected to a high temperature calcination. As in the case of catalysts prepared by in situ processes, calcination temperatures may be greater than about 1100° F., and preferably greater than about 1300° F. and up to 1600° F. The amount of P as $P_2O_5$ may vary between 0.2 and about 10% by weight. Such catalysts that contain P show lower coke and hydrogen yields and consequently higher gasoline yields during catalytic cracking in the presence of contaminant Ni and V than their counterparts that do not contain phosphorus. A catalyst of this type is designated Catalyst E.

The FCC catalysts to which phosphorus is added may also be made by spray drying Y zeolite, calcined clays other than flash calcined kaolin and/or hydrous kaolin, and a silica or alumina-based binder. The catalyst may be made without magnesium phosphate. The catalysts may be bound by a silica-containing binder such as, but not restricted to, sodium silicate or silica sol; or the binder may be an alumina-based binder such as, but not restricted to, an alumina-sol or sodium aluminate.

FCC catalysts prepared by the incorporation route to which phosphorus has been added and then the composite calcined at a high temperature in a relatively dry condition and environment have advantages for catalytic cracking in the presence of Ni and V contaminants. In the presence of Ni and V, such P-containing catalysts show a boost in activity, lower the coke, hydrogen, and total dry gas yields, and increase the yield of gasoline. These catalysts would be particularly useful in the catalytic cracking of heavy resid feeds and heavy gas oil feeds that contain Ni and V contaminants.

Conditions useful in operating FCC units utilizing zeolitic cracking catalysts of the invention are well known in the art and are contemplated in using the catalysts of the invention. These conditions are described in numerous publications including Catal. Rev.—Sci. Eng., 18 (1), 1–150 (1978), which is incorporated herein by cross-reference. The catalysts are of especial benefit when used to crack feeds having a high content of metal contaminants, e.g., 2,000 to 10,000 ppm nickel and 2,000 to 10,000 ppm vanadium. While the invention has been described with especial reference to fluid cracking catalysts, known technology can be used to provide similar catalyst combination in pellet or spherical form suitable for use in moving bed units. Catalysts of the invention can be used to crack conventional hydrocarbon feeds used in catalytic cracking, e.g., naphthas, gas oils and residual oils.

The following tests were used in the accompanying illustrative examples.

X-ray patterns were obtained for the crystallized sodium form catalyst and the finished ion-exchanged catalysts using Cu-K alpha radiation furnished to a Phillips APD 3720 X-ray Diffractometer. This diffraction unit utilizes a 0.2 degree receiving slit in front of a scintillation detector and a "theta compensation" slit on the incident radiation. The effect of theta compensation is to keep a constant area irradiated on the sample which will maintain consistent data collection and enhance weak peak intensities at high 2-theta values. This process may affect peak intensity but does not effect the determination or identification of any species as it does not affect the position of peaks which are the characteristic x-ray finger print signature of crystalline materials. Other standard features of the equipment are a nickel filter and the following scan conditions: scan width=3–80 degrees 2-theta, step width=0.02 degrees 2-theta, count time=1 second.

MAT (microactivity test) is described in U.S. Pat. No. 4,493,902. Before metal impregnation, catalysts are steamed at 1350° F. for two (2) hours followed by the known Mitchell method for impregnating metals. Steaming conditions prior to catalyst testing are also referenced in U.S. Pat. No. 4,493,902 (as the "closed" system). The gas oil used in some of the tests described in this application was CTSGO 175. The properties of this gas oil are set forth in U.S. Pat. No. 5,023,220. A modification of ASTM Standard Test Method D-4365-85 was used for determining that portion of the total area of the catalyst ascribable to micropores, which may be interpreted in terms of percent zeolite and is called "zeolite area". Relative pressures (P/Po) of 0.08, 0.11, 0.14, 0.17 and 0.20 were used for collecting the data, which was used to calculate the BET-area (total surface area) and the t-area (matrix surface area) by the DeBoer t-plot method. The method used differed from the ASTM method in that lower relative pressure points were not used if a negative intercept was obtained (paragraph 10.13.1) and the formula for calculating the t-area did not include the factor 0.975 (paragraph 11.14 and 11.14.1).

FTIR testing was as follows:

Infrared spectra were recorded at 30° C. in the diffuse reflectance mode using a Spectra Tech controlled-environment chamber in a Perkin Elmer Paragon 1000PC spectrometer. The sample was dried for 1 hour at 450° C. under flowing $N_2$, and the dehydration was monitored by observing the disappearance of the water band at 1645 cm$^{-1}$. After the sample was cooled down to 30° C., a spectrum of the sample was collected in the spectral range of 4000–1300 cm$^{-1}$. Pyridine vapor was then introduced to the sample in flowing N$_2$ at 30° C.; after 1 min the pyridine vapor was shut off, and the sample was allowed to equilibrate with the pyridine under flowing N$_2$ for 50 min. at 30° C. A spectrum was then collected. The two spectra collected were treated using the Kubelka-Munk function. A difference spectrum was obtained by subtraction of the spectrum with pyridine from that without pyridine. A characteristic band at 3687 cm$^{-1}$ was observed from the IR spectra of the samples produced when practicing this invention (See FIG. 1). To quantify the 3687 cm$^{-1}$ band and to distinguish the catalyst of this invention from other catalysts, the intensity ratio (measured by the band height) of the band at 3687 cm$^{-1}$ versus that at 3675 cm$^{-1}$ was taken as a criterion. The band height was measured by taking the absorbance at 3800 cm$^{-1}$ as the baseline and then measuring the peak height at the band maxima. The ratio of I (3687 cm$^{-1}$)/I(3675cm$^{-1}$) was then calculated.

The following examples are given for illustrative purposes:

1. Preparation of in Situ Catalysts

In situ catalysts were made from several different microspheres containing different combinations of calcined kaolin clays and binder. The preparation of Y-based FCC catalysts from these microspheres has been described, for example, in U.S. Pat. Nos. 4,493,902, 5,023,220, and 5,395,809. All microspheres were bound by a silica-containing binder. In the examples, the following nomenclature is used. Catalyst made from microspheres containing a clay ratio of about 30% spinel and 70% hydrous clay is called Catalyst A. Catalyst made from microspheres containing a clay ratio of about 60% spinel and 40% hydrous clay is called Catalyst B. Catalyst made from microspheres containing predominantly spinel (>90% spinel) is called Catalyst C. Catalyst made from microspheres containing a ratio of about 15% spinel, 15% gibbsite, and 70% hydrous clay is called Catalyst D. Catalyst made from microsphere containing a ratio of 15% gibbsite and 85% hydrous clay is called Catalyst F.

Phosphorus was added to Catalysts A, B, C, D and F after the Na level in the catalyst had been reduced to below about 0.75 wt % as Na$_2$O. Diammonium or monoammonium phosphate was dissolved in water and added to each of the above catalysts via incipient wetness method. The catalysts were then dried at about 110° C. The catalysts were then calcined at high temperature. Calcination details and details of the catalyst preparation are given below and in the individual examples. Catalysts A, B, D and F used in the examples contain about 1 wt % rare earth oxides; catalyst C contains about 2 wt % rare earth oxide.

P/Catalyst A-1

P/Catalyst A-1 was made from Catalyst A. Diammonium phosphate was dissolved in water and added to Catalyst A to give a total phosphorus content of 2.46 wt % P$_2$O$_5$. After drying, the catalyst was calcined in two stages: at 800° F. for 1 hour and at 1150° F. for 2 h. The matrix and Y surface areas of the catalyst were 87 m$^2$/g and 286 m$^2$/g respectively and the Y unit cell size was 24.52 A. Nickel and V were added to this catalyst via the modified Mitchell method. The catalyst was presteamed for 2 h at 1350° F. in 100% steam, Ni and V were added via the incipient wetness method using nickel oleate and vanadium naphthanate. The organic material was burned off the catalyst, and the catalyst was steamed at 1450° F. for 4 h in a 90% steam/10% air mixture. The catalyst was blended as a 70% catalyst/30% catalytically inert clay microspheres. P/Catalyst A-1 was compared in Example 1 against Catalyst A which had been calcined at 1150° F. but without phosphorus and similarly blended with 30% inert clay microspheres.

P/Catalyst A-2 and P/Catalyst A-3

P/Catalyst A-2 and P/Catalyst A-3 were made from Catalyst A. Diammonium phosphate was dissolved in water and added to Catalyst A to give a total phosphorus content of 2.28 wt % P$_2$O$_5$. One batch, Catalyst A-2, after drying, was calcined in two stages: at 800° F. for 1 hour and at 1337° F. for 2 h. The second batch, Catalyst A-3, after drying, was calcined in two stages: at 800° F. for 1 hour and at 1500° F. for 2 h. The higher temperature calcination is in accord with the present invention. The matrix and Y surface areas of P/Catalyst A-2 were 87 m$^2$/g and 295 m$^2$/g respectively and the Y unit cell size was 24.46 A. The matrix and Y surface areas of P/Catalyst A-3 were 94 m$^2$/g and 270 m$^2$/g respectively and the Y unit cell size was 24.41 A. Nickel and V were added to these catalysts via the modified Mitchell method. The catalysts were presteamed for 2 h at 1350° F. in 100% steam, Ni and V were added via the incipient wetness method using nickel oleate and vanadium naphthanate. The organic material was burned off the catalysts, and the catalysts were steamed at 1450° F. for 4 h in a 90% steam/10% air mixture. The catalysts were blended as a 70% catalyst/30% inert clay microspheres. In Example 2, P/Catalyst A-2 and P/catalyst A-3 were compared to each other and to Catalyst A which had been calcined at 1150° F. but without phosphorus and similarly blended with 30% inert clay microspheres. P/Catalyst A-3 is in accord with the invention.

P/Catalyst B

P/Catalyst B was made from Catalyst B. Diammonium phosphate was dissolved in water and added to Catalyst B to give a total phosphorus content of 3.08 wt % P$_2$O$_5$. After drying, the catalyst was calcined in two stages: at 800° F. for 1 hour and at 1500° F. for 2 h. The matrix and Y surface areas of the catalyst were 110 m$^2$/g and 241 m$^2$/g respectively and the Y unit cell size was 24.38 A. Nickel and V were added to this catalyst via the modified Mitchell method. The catalyst was presteamed for 2 h at 1350° F. in 100% steam, Ni and V were added via the incipient wetness method using nickel oleate and vanadium naphthanate. The organic material was burned off the catalyst, and the catalyst was steamed at 1450° F. for 4 h in a 90% steam/10% air mixture. The catalyst was blended as a 70% catalyst/30% inert clay microspheres. P/Catalyst B was compared in Example 3 against Catalyst B which had been calcined at 1150° F. but without phosphorus and similarly blended with 30% inert clay microspheres. P/Catalyst B is in accord with the invention.

P/Catalyst C

P/Catalyst C was made from Catalyst C (HEZ-55 catalyst). Diammonium phosphate was dissolved in water and added to Catalyst C to give a total phosphorus content of 3.44 wt % P$_2$O$_5$. After drying, the catalyst was calcined in two stages: at 800° F. for 1 hour and at 1500° F. for 2 h. The matrix and Y surface areas of the catalyst were 137 m$^2$/g and 115 m$^2$/g respectively and the Y unit cell size was 24.47 A. Nickel and V were added to this catalyst via the modified Mitchell method. The catalyst was presteamed for 2 h at 1350° F. in 100% steam, Ni and V were added via the incipient wetness method using nickel oleate and vanadium naphthanate. The organic material was burned off the catalyst, and the catalyst was steamed at 1450° F. for 4 h in a 90% steam/10% air mixture. The catalyst was used without any blending with inerts. P/Catalyst C was compared in Example 4 against Catalyst C. P/Catalyst C which is made from a microsphere that initially contains a clay mixture with greater than 90% spinel is outside the scope of this invention.

P/Catalyst D

P/Catalyst D was made from Catalyst D. Diammonium phosphate was dissolved in water and added to Catalyst D to give a total phosphorus content of 2.44 wt % $P_2O_5$. After drying, the catalyst was calcined in two stages: at 800° F. for 1 hour and at 1500° F. for 2 h. The matrix and Y surface areas of the catalyst were 87 $m^2$/g and 276 $m^2$/g respectively and the Y unit cell size was 24.42 A. Nickel and V were added to this catalyst via the modified Mitchell method. The catalyst was presteamed for 2 h at 1350° F. in 100% steam, Ni and V were added via the incipient wetness method using nickel oleate and vanadium naphthanate. The organic material was burned off the catalyst, and the catalyst was steamed at 1450° F. for 4 h in a 90% steam/10% air mixture. P/Catalyst-D was blended as a 70% catalyst/30% inert clay microspheres. P/Catalyst D was compared in Example 5 against Catalyst D which had been calcined at 1150° F. but without phosphorus and similarly blended with 30% inert clay microspheres. P/Catalyst D is in accord with the invention.

P/Catalyst F

P/Catalyst F was made from Catalyst F. Monoammonium phosphate was dissolved in water and added to Catalyst F to give a total phosphorus content of 2.4 wt % $P_2O_5$. After drying, the catalyst was calcined in two stages: at 800° F. for 1 hour and at 1500° F. for 2 hours. The matrix and Y surface areas of the catalyst were 70 $m^2$/g and 299 $m^2$/g respectively and the Y unit cell size was 24.42A. Nickel and V were added to this catalyst via the modified Mitchell method. The catalyst was presteamed for 2 hours at 1350° F. in 100% steam. Ni and V were added via the incipient wetness method using nickel oleate and vanadium naphthanate. The organic material was burned off the catalyst, and the catalyst was steamed at 1450° F. for 4 hours in a 90% steam/10 air mixture. P/Catalyst F was blended as a 70% catalyst/30% inert clay microspheres. P/Catalyst F was compared in Example 7 against Catalyst F which had been calcined at 1150° F. but without phosphorus and similarly blended with 30% inert clay microspheres. P/Catalyst F is in accord with the invention.

2. Preparation of Incorporation Catalysts

Phosphorus-containing catalysts were made by using the finished spray dried catalyst containing Y zeolite, flash calcined kaolin, hydrous clay, magnesium phosphate, and silica sol binder. This catalyst is referred to as Catalyst E. Note Catalyst E contains a small amount of P due to the initial use of magnesium phosphate during catalyst preparation. Diammonium phosphate was dissolved in water and added to Catalyst E via incipient wetness method. The amount of phosphate added was determined by the final P level needed. Catalysts with different levels of P were used. All catalysts were dried at about 110° C. The catalysts were then calcined in two stages: at 800° F. for 1 hour and at 1500° F. for 2 h. All catalysts used in the examples contained about 1.15 wt % rare earth oxides.

P/Catalyst E-1, P/Catalyst E-2, P/Catalyst E-3

Three catalysts were prepared. P/Catalyst E-1 had it $P_2O_5$ from the diammonium phosphate addition. P/Catalyst E-2 had 1.5% $P_2O_5$ from the diammonium phosphate addition. And P/Catalyst E-3 had 2.5% $P_2O_5$ from the diammonium phosphate addition. Table 1 gives the physical properties of the catalysts.

TABLE 1

|  | Catalyst E Reference | P/Catalyst E-1 | P/Catalyst E-2 | P/Catalyst E-3 |
|---|---|---|---|---|
| % $P_2O_5$* | — | 1 | 1.5 | 2.5 |
| Total % $P_2O_5$** | 0.6 | 1.54 | 2.05 | 2.95 |
| Surface areas, $m^2$/g |  |  |  |  |
| Total | 210 | 191 | 178 | 166 |
| Matrix | 47 | 36 | 32 | 30 |
| Y zeolite | 163 | 155 | 146 | 136 |

*From diammonium phosphate addition
**Total, includes phosphate from the magnesium phosphate precursor.

Nickel and V were added to these catalysts via the modified Mitchell method. Each catalyst was presteamed for 2 h at 1450° F. in 100% steam, Ni and V were added via the incipient wetness method using nickel oleate and vanadium naphthanate. The organic material was burned off the catalyst, and the catalyst was steamed at 1450° F. for 4 h in a 90% steam/10% air mixture.

Results of Testing Cataslysts

Microactivity tests (MAT) were carried out on standard MAT equipment using mid-continent gas oil feeds. MAT runs were done at 4, 5, and 6 catalyst/oil ratios, at 910° F., oil delivery time was 48 s. Yield results were regressed to give values at 65% conversion. Conversion is defined as:

$$100-(\text{yields of hydrogen} + H_2S + \text{methane} + C_2 \text{ hydrocarbons} + C_3 \text{ hydrocarbons} + C_4 \text{ hydrocarbons} + \text{gasoline} + \text{coke}).$$

The gasoline cut point via simulated distillation gas chromatography was 421° F. The LCO (liquid cycle oil) cut point was 602° F., higher boiling components are designated as bottoms. MAT activity is calculated as (% conversion)/ (100% conversion on a weight basis). Note only trend comparisons rather than exact comparisons should be made from one example and table to another since different equipment biases are present. However, in the same example and table, detailed and exact comparisons are valid where catalysts were run sequentially on the same unit.

Examples 1 to 5 were obtained using a heavy gas oil CTSGO 3130. The oil had an API gravity of 19.9, a Conradson Carbon value equal to 0.31 wt %, aniline point of 166.5° F., total nitrogen value of 1283 ppm, sulfur level of 2.3 wt %, Na level of 1.5 ppm, and total Ni, V, and Cu levels of <1 ppm. Initial and final boiling points were 537° F. and 1029° F. respectively. Distillation values ° F. were as follows:

| 5% off | 668 |
|---|---|
| 10% off | 707 |
| 30% off | 788 |
| 50% off | 843 |
| 75% off | 919 |
| 90% off | 985 |
| 95% off | 1029 |

Example 6 was carried out using a lighter gas oil CTSGO 175 which has been described in U.S. Pat. No. 5,023,220.

EXAMPLE 1

Table 2 compares results on Catalyst A and P/Catalyst A-1. P/Catalyst A-1 contains 2900 ppm Ni and 2900 ppm V, and Catalyst A contains 3100 ppm Ni and 2900 ppm V. MAT conversions were in the 57 to 70% range. At 6 catalyst/oil ratio, the MAT activity of P/Catalyst A-1 was 2.28 and that of Catalyst A was 2.29; thus there was no change in activity. Yields in Table 2 are regressed to 65% conversion.

As seen from Table 2, the coke yield is 15% lower for P/Catalyst A-1 compared to Catalyst A, and the $H_2$ yield is 25% lower for Catalyst A-1. The decrease in coke make shows up as an increase in gasoline and LPG yields for Catalyst A-1.

TABLE 2

| Catalysts | P/Catalyst A-1 | Catalyst A |
|---|---|---|
| Yield at 65% conversion wt % | | |
| Hydrogen | 0.93 | 1.25 |
| Total dry gas | 2.37 | 2.72 |
| LPG | 9.85 | 9.02 |
| Gasoline | 41.20 | 39.57 |
| Coke | 11.58 | 13.67 |
| LCO | 17.16 | 17.95 |
| Bottoms | 17.84 | 17.05 |

EXAMPLE 2

P/Catalyst A-2 and P/catalyst A-3 are very similar to P/Catalyst A-1, except that P/Catalyst A-2 and P/catalyst A-3, after addition of diammonium phosphate, were dried and calcined at a higher temperatures of 1337° F. and 1500° F. respectively. Table 3 compares results on P/Catalyst A-2, P/Catalyst A-3, and Catalyst A. P/Catalyst A-2 contains 2900 ppm Ni and 2800 ppm V, P/Catalyst A-3 contains 2900 ppm Ni and 2900 Catalyst B contains 2900 ppm Ni and 2900 ppm V, and Catalyst A contains 2900 ppm Ni and 2800 ppm V. MAT conversions were in the 51 to 71% range. At 6 catalyst/oil ratio, the MAT activity of P/Catalyst A-3 was 2.43, MAT activity of P/Catalyst A-2 was 1.95, and that of Catalyst A was 2.00; thus there was a boost in activity for P/Catalyst A-3. Yields in Table 3 are regressed to 65% conversion.

As seen from Table 3, the coke yield for P/Catalyst A-3 is 26% lower compared to Catalyst A, and 17% lower compared to P/Catalyst A-2, and the $H_2$ yield for P/Catalyst A-3 is 39% lower compared to Catalyst A, and 22% lower than P/Catalyst A-2. The decrease in coke make shows up as an increase in gasoline and LPG yields for P/Catalyst A-3. This example therefore shows that for P containing catalysts the higher temperature calcination at 1500° F. is more effective than the lower temperature calcination at 1337° F. and the 1150° F. calcination described in Example 1. The higher temperature calcination gives a boost in activity to P/Catalyst A-3 and it is more effective in coke and hydrogen yield reduction than P/Catalyst A-1 and P/Catalyst A-2, both being compared to Catalyst A which does not contain P. And consequently more gasoline may be obtained with such catalysts. This is in accordance with the present invention.

TABLE 3

| Catalysts | P/Catalyst A-2 | P/Catalyst A-3 | Catalyst A |
|---|---|---|---|
| Yield at 65% conversion wt % | | | |
| Hydrogen | 1.06 | 0.83 | 1.36 |
| Total dry gas | 2.60 | 2.30 | 2.96 |
| LPG | 10.26 | 10.59 | 9.53 |
| Gasoline | 39.79 | 41.84 | 38.49 |
| Coke | 12.35 | 10.27 | 14.01 |
| LCO | 17.53 | 17.20 | 17.56 |
| Bottoms | 17.47 | 17.80 | 17.44 |

EXAMPLE 3

P/Catalyst B was made from Catalyst B which is made from a clay microsphere that is different than that used for Catalyst A; the amount of spinel in the starting microsphere for Catalyst B is higher, 60%, compared to about 30% spinel in the starting microsphere for Catalyst A. Table 4 compares results on P/Catalyst B and Catalyst B. P/Catalyst B contains 3100 ppm Ni and 3300 ppm V, and Catalyst B contains 3100 ppm Ni and 3300 ppm V. MAT conversions were in the 60 to 73% range. At 6 catalyst/oil ratio, the MAT activity of P/Catalyst B was 2.73 and that of Catalyst B was 2.42; thus P/Catalyst B was more active. Yields in Table 4 are regressed to 65% conversion.

As seen from Table 4, the coke yield is 12% lower for P/catalyst B compared to Catalyst B, and the $H_2$ yield is 23% lower for P/Catalyst B. The decrease in coke make shows up as an increase in gasoline and LPG yields for P/Catalyst B. Comparing Example 2 and this example, it is noted that addition of phosphorus and the subsequent high temperature calcination is more effective for catalysts that initially contain lower amounts of spinel in the microsphere such as P/Catalyst A-3.

TABLE 4

| Catalysts | P/Catalyst B | Catalyst B |
|---|---|---|
| Yield at 65% conversion wt % | | |
| Hydrogen | 0.96 | 1.24 |
| Total dry gas | 2.38 | 2.71 |
| LPG | 9.61 | 8.83 |
| Gasoline | 40.63 | 39.33 |
| Coke | 12.38 | 14.12 |
| LCO | 17.80 | 17.91 |
| Bottoms | 17.20 | 17.09 |

EXAMPLE 4

Table 5 compares results on P/Catalyst C and Catalyst C. P/Catalyst C contains 3000 ppm Ni and 3000 ppm V, and Catalyst C contains 2500 ppm Ni and 3000 ppm V. MAT conversions were in the 58 to 74% range. At 6 catalyst/oil ratio, the MAT activity of P/Catalyst C was 2.27, and that of Catalyst C was 2.85; thus here the phosphated catalyst did not show a boost in activity and in fact the activity was lower than Catalyst C. Yields in Table 5 are regressed to 65% conversion.

As seen from Table 5, the coke yield for P/Catalyst C was not lower than for Catalyst C. This example shows that for P containing Catalyst C, calcined at 1500° F., does not lower the coke or hydrogen yields. This is unlike the results for catalysts described in this document that contain less than 90% spinel in the starting microsphere. P/Catalyst C is not in accordance with our invention.

TABLE 5

| Catalysts | P/Catalyst C | Catalyst C |
|---|---|---|
| Yield at 65% conversion wt % | | |
| Hydrogen | 0.95 | 0.88 |
| Total dry gas | 2.43 | 2.35 |
| LPG | 9.23 | 9.23 |
| Gasoline | 40.29 | 40.94 |
| Coke | 13.05 | 12.48 |
| LCO | 17.87 | 17.96 |
| Bottoms | 17.13 | 17.04 |

EXAMPLE 5

Table 6 compares results on P/Catalyst D and Catalyst D. P/Catalyst D contains 2900 ppm Ni and 3000 ppm V, and Catalyst D contains 3100 ppm Ni and 3100 ppm V. MAT conversions were in the 57 to 70% range. At 6 catalyst/oil ratio, the MAT activity of P/Catalyst D was 2.37, and that of Catalyst D was 2.14; the phosphated catalyst showed an activity increase of 10%. Yields in Table 6 are regressed to 65% conversion.

As seen from Table 6, the coke yield for P/Catalyst D is 33% lower compared to Catalyst D, and the $H_2$ yield for P/Catalyst D is 76% lower compared to Catalyst D. The decrease in coke make shows up as an increase in gasoline and LPG yields for P/Catalyst D. The phosphated catalyst after high temperature calcination gives an increase in activity and is extremely effective in coke and hydrogen yield reduction than Catalyst D. Consequently more gasoline may be obtained with P/Catalyst D. This is in accord with the present invention.

TABLE 6

| Catalysts | P/Catalyst D | Catalyst D |
|---|---|---|
| Yield at 65% conversion wt % | | |
| Hydrogen | 0.29 | 1.21 |
| Total dry gas | 1.76 | 2.58 |
| LPG | 11.33 | 8.91 |
| Gasoline | 43.01 | 40.27 |
| Coke | 8.9 | 13.24 |
| LCO | 15.18 | 18.25 |
| Bottoms | 19.82 | 16.75 |

EXAMPLE 6

Comparisons in Table 7 are between the catalysts described in Table 1: Catalyst E, a catalyst made by the incorporation route, to which there was no addition of phosphorus via mono or diammonium phosphate, and catalysts P/Catalyst E-1, P/Catalyst E-2, P/Catalyst E-3 with different levels of P added via diammonium phosphate and then calcined. All product yields have been regressed to 65% conversion. As seen from Table 7, the coke and hydrogen yields are lower for the phosphated catalysts. These yields become lower as the P content increases. The decrease in coke make shows up as an increase in gasoline yields for the phosphated catalysts.

TABLE 7

| | Catalyst E Reference | P/Catalyst E-1 | P/Catalyst E-2 | P/Catalyst E-3 |
|---|---|---|---|---|
| % $P_2O_5$ | — | 1 | 1.5 | 2.5 |
| Yields at 65% conversion wt % | | | | |
| Hydrogen | 0.82 | 0.77 | 0.62 | 0.57 |
| Total dry gas | 1.90 | 1.78 | 1.57 | 1.54 |
| LPG | 10.29 | 9.53 | 9.76 | 10.89 |
| Gasoline | 46.67 | 48.02 | 48.51 | 47.71 |
| Coke | 6.15 | 5.68 | 5.16 | 4.87 |
| LCO | 21.76 | 21.09 | 20.4 | 20.08 |
| Bottoms | 13.24 | 13.91 | 14.6 | 14.92 |

EXAMPLE 7

Table 8 compares results on P/Catalyst F and Catalyst F. P/Catalyst F contains 2900 ppm Ni and 2900 ppm V, and Catalyst F contains 3000 ppm Ni and 3100 ppm V. MAT conversions were in the 51 to 70% range. At 6 catalyst/oil ratio, the MAT activity of P/Catalyst F was 2.29 and that of Catalyst F was 1.66; the phosphated catalyst showed an activity increase of 27%. Yields in Table 8 are regressed to 65% conversion.

As seen from Table 8, the coke yield for P/Catalyst F is 44% lower compared to Catalyst F, and the $H_2$ yield for P/Catalyst F is 77% lower compared to Catalyst F. The decrease in coke make shows up as an increase in gasoline and LPG yields for P/Catalyst F. The phosphated catalyst after high temperature calcination gives an increase in activity and is extremely effective in coke and hydrogen yield reduction as compared to Catalyst F. Consequently, more gasoline may be obtained with P/Catalyst F. This is in accord with the present invention.

TABLE 8

| Catalysts | P/Catalyst F | Catalyst F |
|---|---|---|
| Yield at 65% conversion wt % | | |
| Hydrogen | 0.22 | 1.42 |
| Total dry gas | 1.86 | 2.92 |
| LPG | 11.34 | 9.32 |
| Gasoline | 44.10 | 39.10 |
| Coke | 7.70 | 13.66 |
| LCO | 15.64 | 18.03 |
| Bottoms | 19.36 | 16.97 |

EXAMPLE 8

Figure 2:
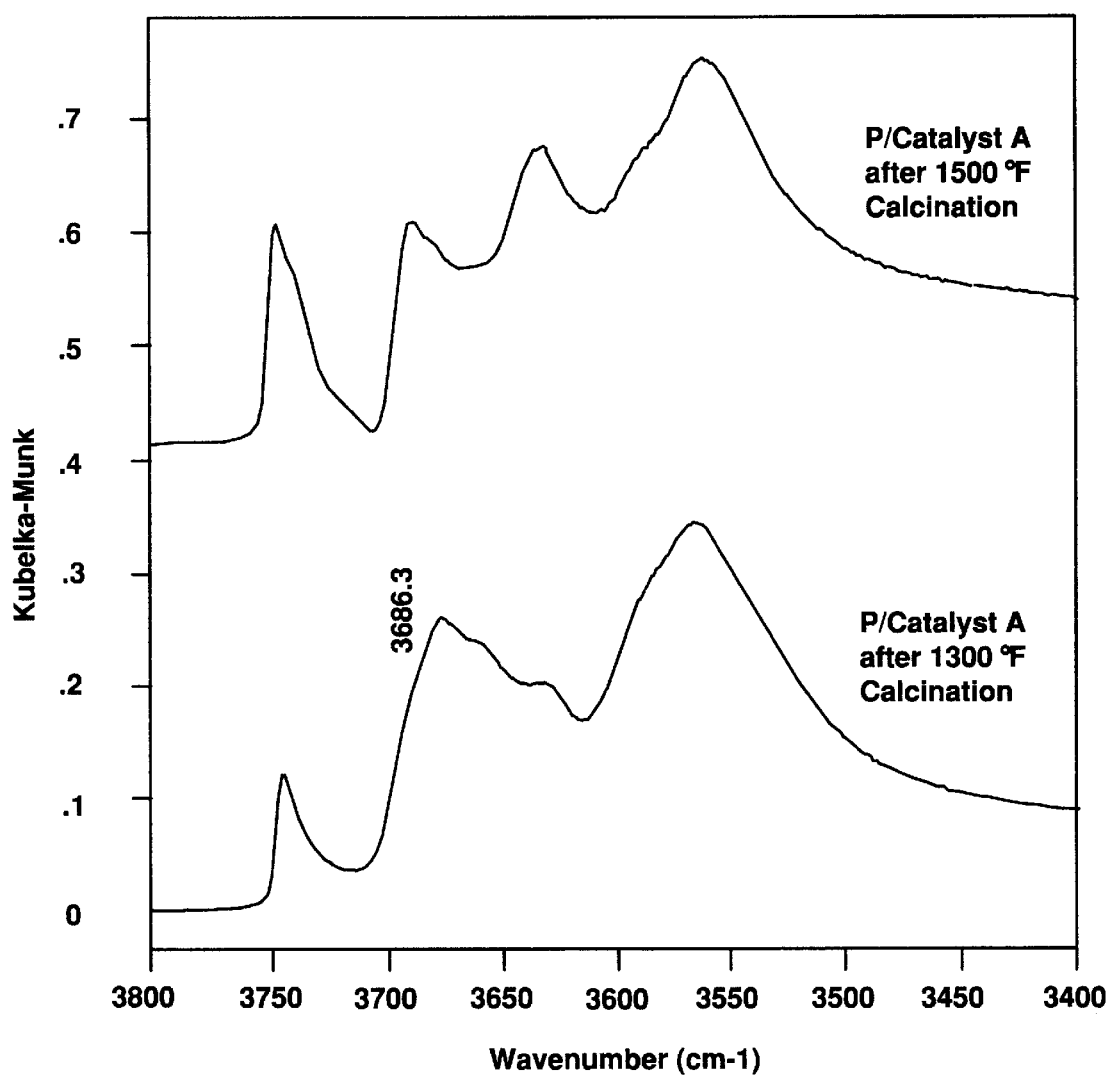
FIG. 2 represents FTIR testing of phosphorus catalyst A after 1,500° F. calcination and phosphorus catalyst A after 1,300° F. calcination.
Figure 3:
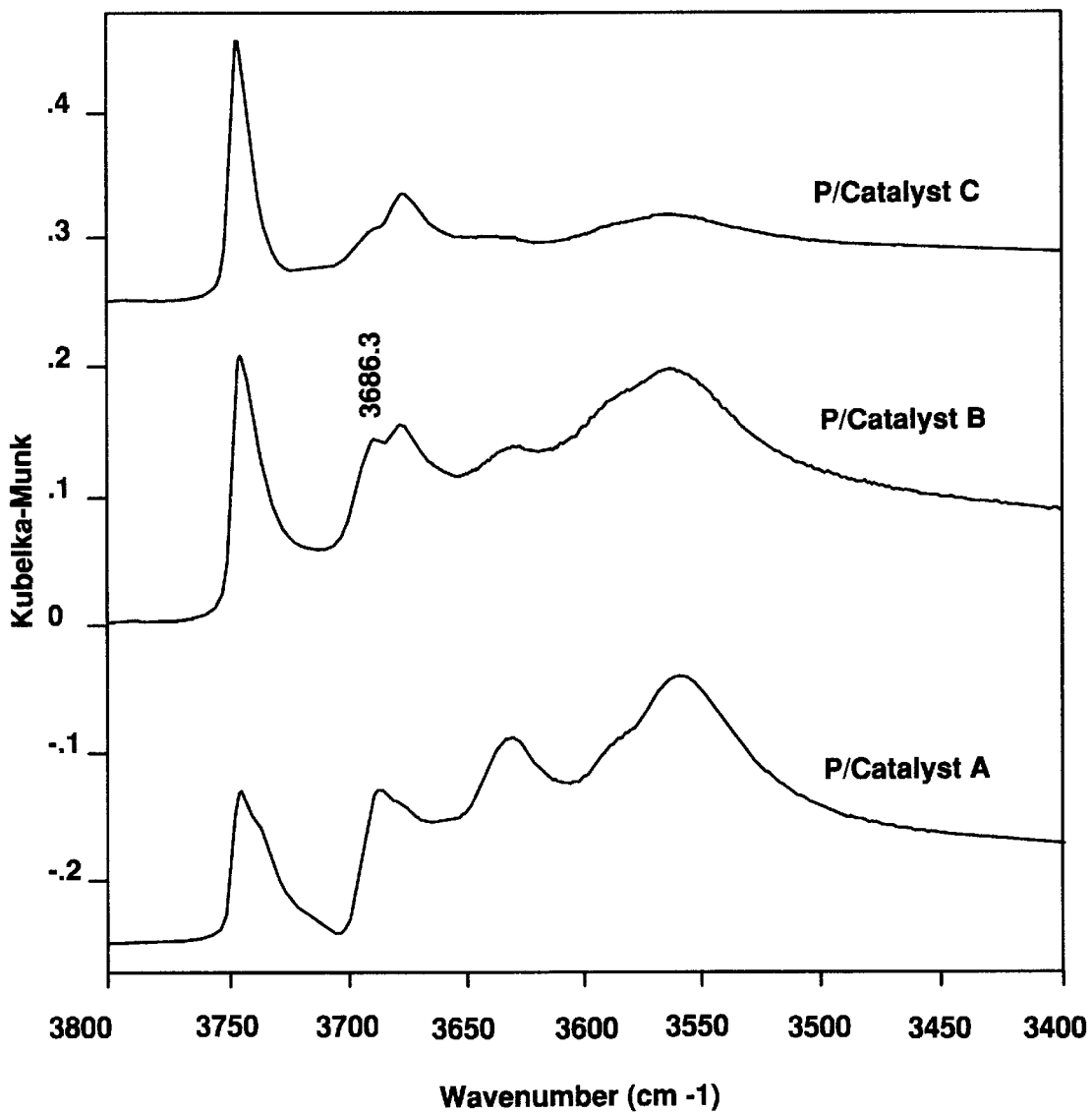
FIG. 3 represents FTIR testing of platinum catalyst C, platinum catalyst B and phosphorus catalyst A.

Pyridine adsorbed FTIR scan in FIG. 1 showed a band at 3687 cm$^{-1}$ for a catalyst representative of P/Catalyst A-3. In comparison with the catalyst without phosphorous, no such band is present (see FIG. 1). The 3687 cm$^{-1}$ band was very weak for the same catalyst if calcined at a lower temperature (see FIG. 2 where the band is not well resolved and only a shoulder can be seen at the position of 3687 cm–$^{1}$). FIG. 3 shows scans of catalyst representative of P/Catalyst A-3, P/Catalyst B, and P/Catalyst C all calcined at 1500° F. P/Catalyst C showed no improvement in the coke yield as indicated in Example 4 and correspondingly, this catalyst shows a very weak 3687 cm–$^{1}$ band in FIG. 3. Catalyst representative of P/Catalyst B shows an increased band intensity at 3687 cm–$^{1}$.

Note in Examples 2 and 3 that the P/Catalyst B is an improvement over Catalyst B but not as effective as P/Catalyst A-3. The intensity ratio I (3687 cm$^{-1}$)/I(3675 cm–$^1$) for P/Catalyst A is 1.13, P/Catalyst B is 0.93, and P/Catalyst C is 0.68. On the basis of these observations, it was concluded that the characteristics of catalyst of this invention are (1) having a well resolved 3687 cm–$^1$ band in its IR spectrum and (2) the intensity ratio of the bands at 3687 and 3675 cm–$^1$ should be greater than about 0.8 to a maximum of 10 or above.

We claim:

1. A phosphorus treated cracking catalyst containing less than 0.75% by weight of $Na_2O$ comprising zeolite Y crystals in an inorganic oxide matrix wherein said phosphorus is added to said cracking catalyst in an amount of from 0.01 to 10 wt. % calculated as $P_2O_5$ and said phosphorus treated cracking catalyst is calcined at a temperature of 1400–1650° F. in the absence of added steam wherein said catalyst is further characterized as containing less than 90% by weight spinel when prepared by in situ routes.

2. The catalyst of claim 1 wherein said source of phosphorus is selected from the group consisting of monoammonium phosphate, diammonium phosphate, triammonium phosphate, monoammonium phosphite, diammonium phosphite and triammonium phosphite and mixtures thereof.

3. A process for manufacturing an FCC catalyst characterized by high tolerance to contaminated metals which comprises:

a) providing fluid cracking catalyst microspheres containing zeolite Y in an inorganic oxide matrix and analyzing 20 to 60% by weight $Al_2O_3$ and analyzing less than 0.75% wt. $Na_2O$;

b) impregnating said catalyst with a source of phosphorus in an amount sufficient such that the micropsheres analyze 0.5 to 10% by weight $P_2O_5$ after step c;

c) calcining said microspheres in the absence of steam at a temperature of about 1400° F. and 1600° F.

4. A zeolitic fluid catalytic cracking catalyst having reduced coke yield and produced by the steps comprising:

(a) forming an aqueous slurry containing about 30 to 100 parts by weight hydrated kaolin clay and about 70 to 10 parts by weight kaolin clay that has been calcined through its characteristic exotherm, and a silica binder;

(b) spray drying the aqueous slurry to obtain microspheres;

(c) calcining the microspheres obtained in step (b) at a temperature and for a time sufficient to convert the hydrated kaolin clay in the microspheres substantially to metakaolin, but insufficient to cause metakaolin to undergo the characteristic kaolin exotherm;

(d) mixing the microspheres obtained in step (c) with a solution comprising sodium silicate to obtain an alkaline slurry;

(e) heating the slurry of microspheres of calcined clay to a temperature and for a time sufficient to crystallize at least about 40% by weight Y-faujasite in the microspheres, said Y-faujasite being in the sodium form;

(f) ion-exchanging, calcining, and re-ion exchanging the microspheres from step (e) to reduce the $Na_2O$ content to a value below 0.75%;

(g) adding a solution of ammonium mono, di or tri phosphate or phosphite to the microspheres;

(h) and drying the microspheres from step (g) and then calcining them in the absence of added steam at a temperature between 1400° F. and 1650° F.

5. A method for making a high zeolite content fluid catalytic cracking catalyst comprising the steps of:

(a) forming an aqueous slurry containing about 40 to 90 parts by weight hydrated kaolin clay, about 1 to 30 parts by weight gibbsite, about 1–30 parts by weight kaolin clay that has been calcined through its characteristic exotherm, and a binder, said slurry having a pH below 7;

(b) spray drying the aqueous slurry to obtain microspheres and washing the microspheres until they are substantially free of sodium;

(c) calcining the microspheres obtained in step (b) at a temperature and for a time sufficient to convert the hydrated kaolin clay in the microspheres substantially to metakaolin, but insufficient to cause metakaolin or hydrated kaolin to undergo the characteristic kaolin exotherm;

(d) mixing the microspheres obtained in step (c) with sodium silicate, sodium hydroxide and water to obtain an alkaline slurry; and (e) heating the slurry of microspheres of calcined clay to a temperature and for a time sufficient to crystallize at least about 40% by weight Y-faujasite in the microspheres, said Y-faujasite being in the sodium form;

(f) ion-exchanging, calcining and re-ion exchanging the microspheres from step (e) to reduce the $Na_2O$ content to a value below 0.75%;

(g) adding a solution of mono, di or tri ammonium phosphate or ammonium phosphite to the microspheres;

(h) and drying the microspheres from step (g) and then calcining them in the absence of added steam at a temperature between 1400° F. and 1600° F.

6. A method for making a high zeolite content fluid catalytic cracking catalyst comprising the steps of:

(a) forming an aqueous slurry containing about 40 to 95 parts by weight hydrated kaolin clay, about 5 to 60 parts by weight gibbsite, a binder and having a pH below 7;

(b) spray drying the aqueous slurry to obtain microspheres and washing the microspheres until they are substantially free of sodium;

(c) calcining the microspheres obtained in step (b) at a temperature and for a time sufficient to convert the hydrated kaolin clay in the microspheres substantially to metakaolin, but insufficient to cause metakaolin or hydrated kaolin to undergo the characteristic kaolin exotherm;

(d) mixing the microspheres obtained in step (c) with sodium silicate, sodium hydroxide and water to obtain an alkaline slurry; and (e) heating the slurry of microspheres of calcined clay to a temperature and for a time sufficient to crystallize at least about 40% by weight Y-faujasite in the microspheres, said Y-faujasite being in the sodium form;

(f) ion-exchanging calcining and re-ion exchanging the microspheres from step (e) to reduce the $Na_2O$ content to a value below 0.75%;

(g) adding a solution of mono, di or tri ammonium phosphate or ammonium phosphite to the microspheres;

(h) and drying the microspheres from step (g) and then calcining them in the absence of added steam at a temperature between 1400° F. and 1650° F.

7. A process for catalytically cracking oil feedstock contaminated with at least one metal selected from the group consisting of nickel and vanadium wherein the catalyst is the catalyst of claim 1.

* * * * *